Dec. 23, 1969  J. C. WHELAN  3,484,948
APPARATUS FOR EXCHANGING HEAT BETWEEN
A GAS AND A PARTICULATE MATTER
Filed Aug. 9, 1967  2 Sheets-Sheet 1

INVENTOR.
John C. Whelan
BY *Flehr, Hohbach, Test,*
*Albritton & Herbert*
Attorneys

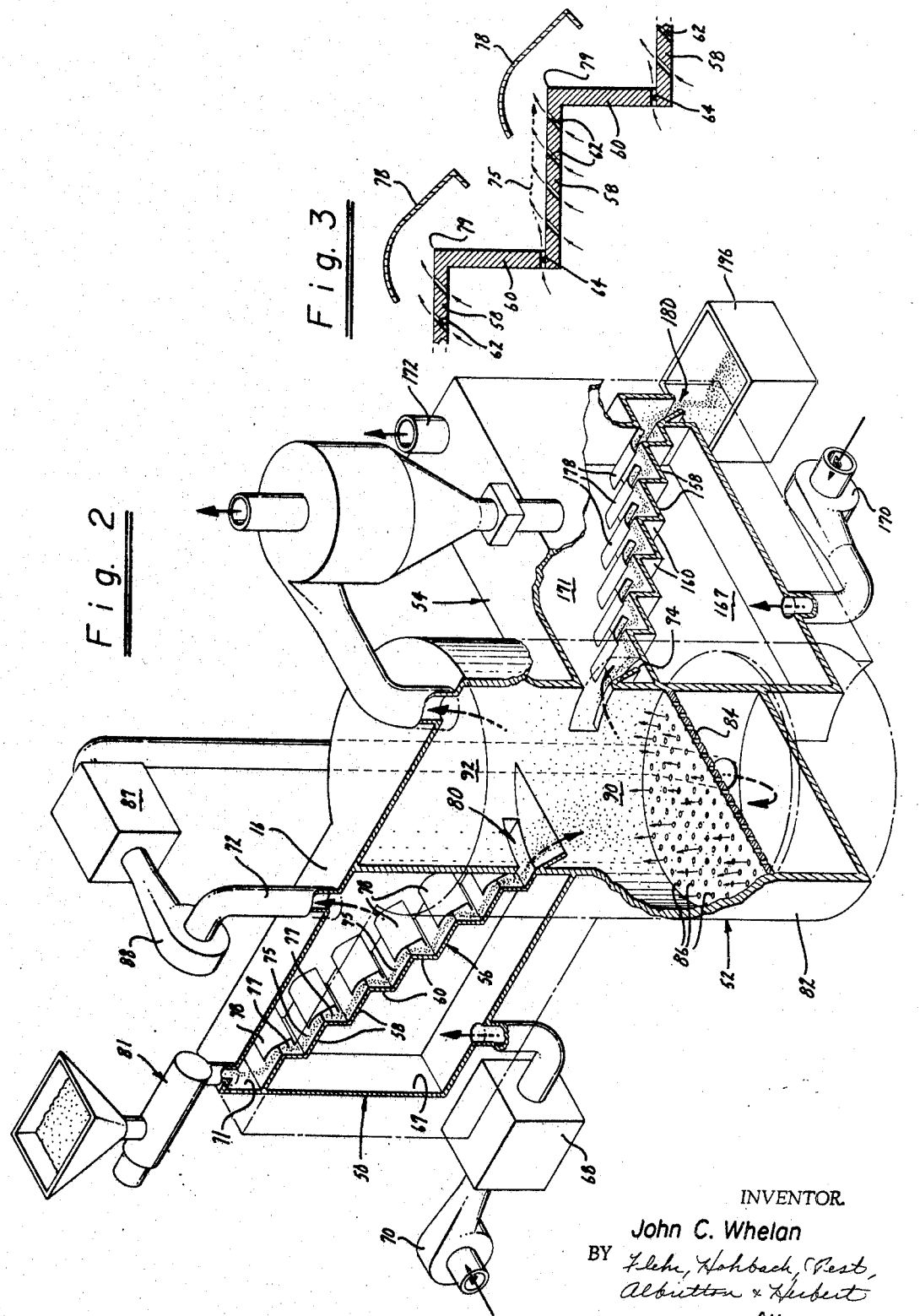

ically has been reestablished, the particles are impinged into the baffles and dropped back into the air stream. Due to the turbulence of the air stream about the accelerating particles the heat transfer therebetween is greatly enhanced. The conveyor can thus be made more compact as compared to conventional pneumatic conveyors since the particles spend less time at the velocity of the conveying stream where boundary layer conditions tend to insulate the particles from contact with the conveyor gas.

3,484,948

APPARATUS FOR EXCHANGING HEAT BETWEEN A GAS AND A PARTICULATE MATTER

John Campbell Whelan, 632 1st St., Woodland, Calif. 95695
Filed Aug. 9, 1967, Ser. No. 659,466
Int. Cl. F26b 3/08, 17/10

U.S. Cl. 34—57          1 Claim

ABSTRACT OF THE DISCLOSURE

A heat exchanger including an open channel pneumatic conveyor is provided with baffles for stopping a stream of particles conveyed by a gas stream supplied at a temperature different from the particles. The baffles are positioned at spaced locations along the conveyor, the distance between baffles corresponding to a distance somewhat less than that required to bring the particles up to the speed in the air stream. In this way, laminar flow of particles in the air stream is disrupted, and the boundary layer of gas enveloping the particles is broken down. Air table, step cascade, and saw tooth conveyors are disclosed. A series combination of pneumatic conveyor preheater, a fluidized bed exchanger, and pneumatic conveyor cooler is also disclosed for grain drying.

Background of the invention

This invention relates to the exchanging of heat between a gas and particles of matter and more particularly to the drying, heating and cooling of particles as in food dehydration.

Herefore, fluidized beds and pneumatic conveying systems have been used for purposes similiar to the above but the results have not been entirely satisfactory due to an inability to simultaneously achieve large heat transfer, low material velocities and high capacity performance in a compact and efficient system. There is, therefore, a need for a new and improved apparatus for exchanging heat between a gas and particulate matter.

In general, it is an object of the present invention to provide apparatus for exchanging heat between a gas and particles of matter, such as solids, and for drying, heating and cooling the particles which will overcome the above-mentioned limitations and disadvantages.

Another object of the invention is to provide an apparatus of the above character in which greatly enhanced heat transfer between the gas and particles is secured.

Another object of the invention is to provide an apparatus of the above character which is particularly applicable to the drying or puffing of grain cereals, and to drying, roasting and other food processing operations.

These and other objects are accomplished by providing a system for exchanging heat between the particles of matter and gas in which there is provided a source of gas at a predetermined temperature which is supplied to a pneumatic conveyor to create a particles conveying gas stream therein. Suitable means delivers the particles to be processed to the pneumatic conveyor for flowing in the gas stream. Means is provided for intermittently interrupting the flow of the particles in the gas stream to disrupt the thin envelope or boundary layer of gas which develops about the flowing particles and for creating turbulent flow of gas about the solids to thereby increase the contact and transferring of heat between the gas and the particles. As an example of one application of the invention, there is described apparatus for drying grain in which pneumatic conveyors constructed according to the invention are coupled to the input and output of a fluidized bed reaction vessel for preheating the grain as it enters the vessel and for cooling the grain after it leaves.

The preferred embodiments are characterized by open channel flow in which particles of solids are conveyed in a vertically undulating stream which is interrupted by baffles at the crests.

Description of the drawings

FIGURE 2 is a side elevational view, partially in schematic, of drying apparatus utilizing modified pneumatic conveyors constructed according to the invention.

FIGURE 3 is an elevational view in cross section of a portion of the pneumatic conveyor preheater utilized in the apparatus of FIGURE 2.

Detailed description

Figure 1:
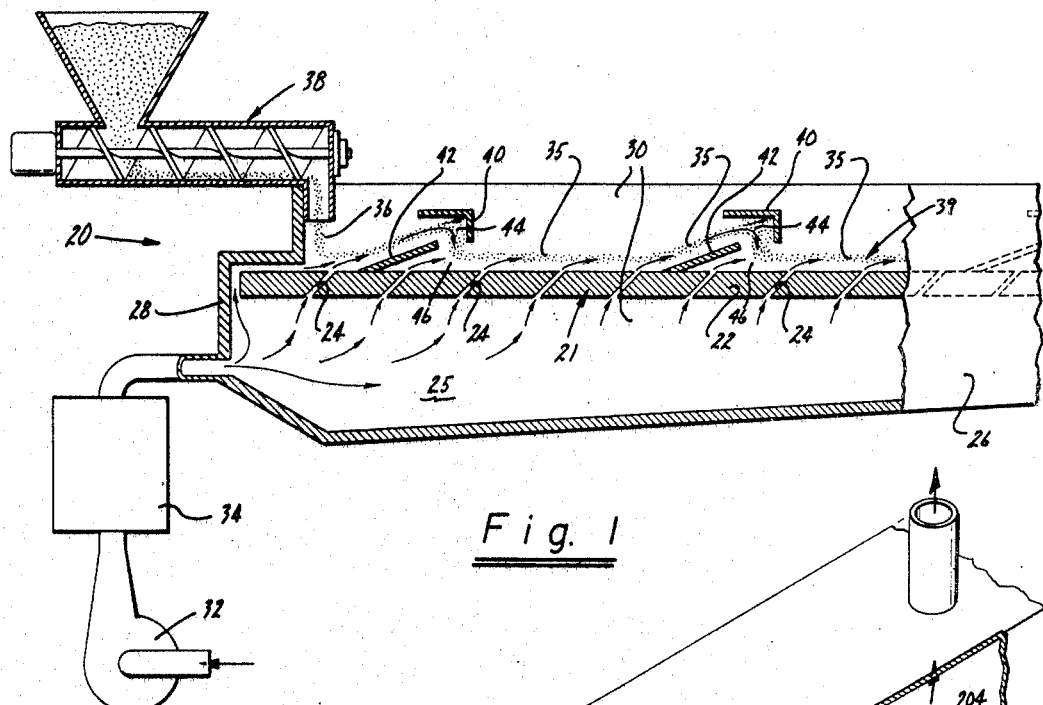
FIGURE 1 is an elevational view of the pneumatic conveyor constructed according to the invention.

Referring to FIGURE 1, there is shown a form of pneumatic conveyor 20 by which the invention was put into practice. Thus, there is provided an open air table 21 including a generally horizontally extending bounding plate 22 along which particles of solid material are conveyed by the action of air being passed upwardly through passages 24 which are inclined in the direction of desired motion. An inlet air chamber 25 is formed below the plate 22 by walls including those shown at 26, 28 and 30. A suitable blower 32 is connected in series with a heater 34 for supplying inlet air to chamber 25 at a predetermined temperature and pressure. A portion of the air passing through passages 24 lifts the solids into suspension above the plate 22 and other portions of the air impel solids along the plate in the direction of the inclination of the passages. Thus, a conveying air stream 35 is created which carries and propels solids along the conveyor 20.

Suitable means is provided for delivering particulate solids 36 to the input end of the conveyor and can consist of a feeder such as a screw feeder and hopper 38. Solids 36 delivered to the conveyor are continually impinged by the air stream 35 and are caused to be accelerated in the direction of the motion of stream 35 to form a flowing solids stream 39.

Means is provided for intermittently interrupting the flow of solids along the conveyor to thereby decelerate them and prevent their maintaining a stable velocity in the conveying air stream 35. Such means preferably consists of a plurality of baffles 40 mounted at spaced-apart locations along the conveyor and above the air stream. A weir ramp 42 is provided before each baffle to deflect solids upwardly into each baffle. The spacing of the baffles is such that the particles cannot sustain a stable maximum velocity along the conveyor but rather are allowed to only attain a partial velocity after which they impinge into the baffle and are stopped and drop back into the air stream where they are then accelerated to the next baffle. Preferably, each baffle contains a portion 40a inclined to and positioned in the path of the particles stream to deflect it and another portion 40b for blocking the motion of the particles intercepted and deflected by portion 40a.

In the apparatus of the present invention, the solid particles spend most of the time being accelerated up to the velocity of the moving air stream. During this period the air stream has a turbulent character and the aforementioned protective boundary layer enveloping the particle is not yet established. As the particle comes up to speed and laminar flow of the air stream and particles begins, the particle motion is intercepted by the baffles and the particle is decelerated to repeat the cycle.

By use of the present invention the heat exchange between the solids and the air stream is found to be greatly enhanced and the required amount of equipment and dwell time are reduced accordingly. The deceleration caused by the apparatus of the present invention is believed to enhance the heat transfer between the gas and the solid by breaking down the boundary layer which envelops a solid particle as it moves at stable velocity in the air stream. In the absence of turbulent flow, a boundary layer or laminae of gas surrounds the solid particles and moves with it in the air stream. And adjacent laminae in the air stream have only successively slightly higher velocities. Under such conditions, only limited molecular diffusion and conduction between laminae provides heat exchange since mixing of laminae is not possible under conditions of laminar flow. In the absence of mixing of laminae, the exchange of heat between the gas and solid through the laminae is poor.

By providing for the intermittent interruption of flow and deceleration of the particles in the conveyor of the present invention, the boundary layers or laminae enveloping the particle are disrupted so that exchange between the laminae takes place. The exchange of heat between the solids and other portions of the gas stream is greatly enhanced. Also, by decelerating the solids in the manner of the invention, those characteristics pertaining to the flow of the solids in the air stream can be shifted to values at which turbulent flow is induced. This also enhances heat exchange between the air stream and the particles by bringing new gas molecules continually into heat exchange relationship with the particles.

The deceleration caused by the present invention is believed to enhance heat transfer by breaking down the thin stationary boundary layer enveloping a solid particle as it moves near the velocity of the air stream. The exchange of heat to or from the solid particle results from contact with the gas in which it is immersed and flowing. But, when the solid moves at the velocity of the stream, a thin layer of the gas adjacent to the solid particle envelops it. This layer is stationary at the surface of the particle while the gas at successively greater distances may move at other velocities. In general, then, a velocity gradient exists in which there is now movement through the film that envelopes the moves with the particle. By providing for the intermittent interruption of flow and deceleration of the particle in the conveyor, the thin stationary boundary layer enveloping the particle is believed to be disrupted and turbulent flow created so that the contact and opportunity for transfer of heat between the solids and other portions of the gas in which the solids are flowing is greatly enhanced.

In operation, the apparatus is characterized by open-channel flow in which solids are conveyed in a vertically undulating stream 39, the crests 44 of the stream impinging each ramp 42 to form crests 44 and dropping to form troughs 46 below the ramp and somewhat beyond it, depending upon the velocity of the stream. Baffles 40 are located so as to intercept the flow of solids at the crests 44 of the stream. In the following descriptions, other structures are disclosed which are similarly characterized and include a downward cascade of steps, and horizontally extending saw tooth structure.

Referring to FIGURE 2, there is shown grain drying apparatus constructed according to the invention and incorporating a modified pneumatic conveyor utilizing a cascade of steps. Thus, the drying apparatus consists generally of a pneumatic conveyor preheater 50 providing a solids input of a fluidized-bed heat exchanger 52, and a pneumatic conveyor cooler 54 for receiving the solid output of the heat exchanger.

Preheater 50 consists of a pneumatic conveyor including a gas distribution plate or table 56 having the form of a downwardly progressing cascade or flight of steps including treads 58 and risers 60. Treads 58 are provided with an array of inclined passages 62 therethrough for passing gases upwardly, and risers 60 are provided with horizontally extending passages 64 adjacent the juncture of the tread immediately below for passing gas horizontally along the tread. Gas distribution plate 56 is supported in a closed vessel 16 and divides it into upper and lower regions, the lower region serving as an inlet plenum 67 for receiving heated gases supplied from heater 68 by blower 70. The upper region 71 collects gases after their contact with the solids stream and deliver the gas to an outlet 72. As the gas passes through the passages 62, 64 in the plate 56, a solids conveying air stream 75 is formed by the upward lift and forward propelling thrust of the jets of gas passing through passages 62 and a horizontal propelling thrust of the jets supplied by passages 64.

A suitable feeder, such as a screw feeder 81, is connected through the vessel to deliver a stream of solids to the upper end of the cascade. The solids are conveyed in the air stream 75 and, accordingly, cascade downwardly in an undulating stream 77.

Means are provided for intercepting the flow of solids at the crests of stream 77 and consists of a plurality of baffles 78. Each baffle 78 is mounted to intersect the path of solids leaving a particular step and generally overlies the step and is spaced upwardly and away from its outer edge 79. Each baffle includes an upper generally horizontal portion providing for upper containment of the solid stream and a generally vertical portion positioned directly in the path of the stream for blocking flow and forward motion and for directly the solids downwardly to the next step to which they fall under gravity. The last step is connected to a solids feed input 80 of a fluidized bed heat exchanger 52.

Heat exchanger 52 serves as containment or holding station for maintaining the solids at a desired temperature for a predetermined time required for the expulsion of moisture. Preferably, heat exchanger 52 comprises a relatively conventional fluidized-bed system comprising a closed vessel having a bounding plate 82 containing a gas distributor or constriction plate 84 having passages 86 therethrough which control the flow of gases through the vessel. The region below plate 84 serves as an inlet plenum for supplying gas to the underside of plate 84 and is connected to a reheater 87 and blower 88, the input to which is preferably obtained from the output 72 of preheater 50.

In the region above the distributor plate 84 there is formed a fluidized bed 90 of solids above which is a disengaging space 92. The depth of the bed 90 is determined by the height of the solids discharge outlet which can consist of a conventional overflow weir ramp 94. The exhaust gas and entraining solids which leave the upper region of the heat exchanger 52 are passed through a conventional cyclone dust separator.

Solids being discharged over the weir ramp 94 are passed into the input of a pneumatic conveyor type cooler 54 which is constructed in the same manner as preheater 50 and is accordingly given the same numbers plus 100 as the corresponding parts of preheater 50. Since the preheater and cooler are identically constructed, the latter need not be discussed in detail. The gas flow to the inlet plenum 167 of the cooler is taken directly from ambient air and is supplied directly from blower 170 without heating. The solids are discharged from the cooler into a conveyor 196 for storage or for passing it on to other processing operations.

In operation, solids delivered to the preheater 50 cascade through it in an undulating pattern which is interrupted at each crest by a baffle. In this way, the gas which tends to surround the grain particles as they approach the velocity of the conveying gas stream is broken down. This results in greatly enhanced heat exchange between the gas and the particles being treated.

By way of comparison, the grain drier of FIGURE 2 was compared with an efficient, conventional, bed-type drier, both of which operate to dry the grain in three phases consisting of (a) period of heatup to an efficient drying temperature, (b) steady-rate drying period at that temperature, and (c) cooling to desired storage temperature. The conventional drier consisted of a fluidized bed preheater, a fluidized bed to hold the grain during the steady-rate drying period, and a fluidized bed cooler. Both driers were operated at identical temperatures, and the grain used had identical initial and final moistures. The result of the comparison was:

|  | Drier constructed according to invention (secs.) | Conventional drier (secs.) |
|---|---|---|
| Preheat time | 7 | 115 |
| Steady-rate time | 120 | 120 |
| Cooling time | 18 | 105 |
| Total | 145 | 340 |

From the above, it is obvious that the drier constructed according to the invention has 235% more capacity than the conventional drier because of the throughput time involved.

Figure 4:
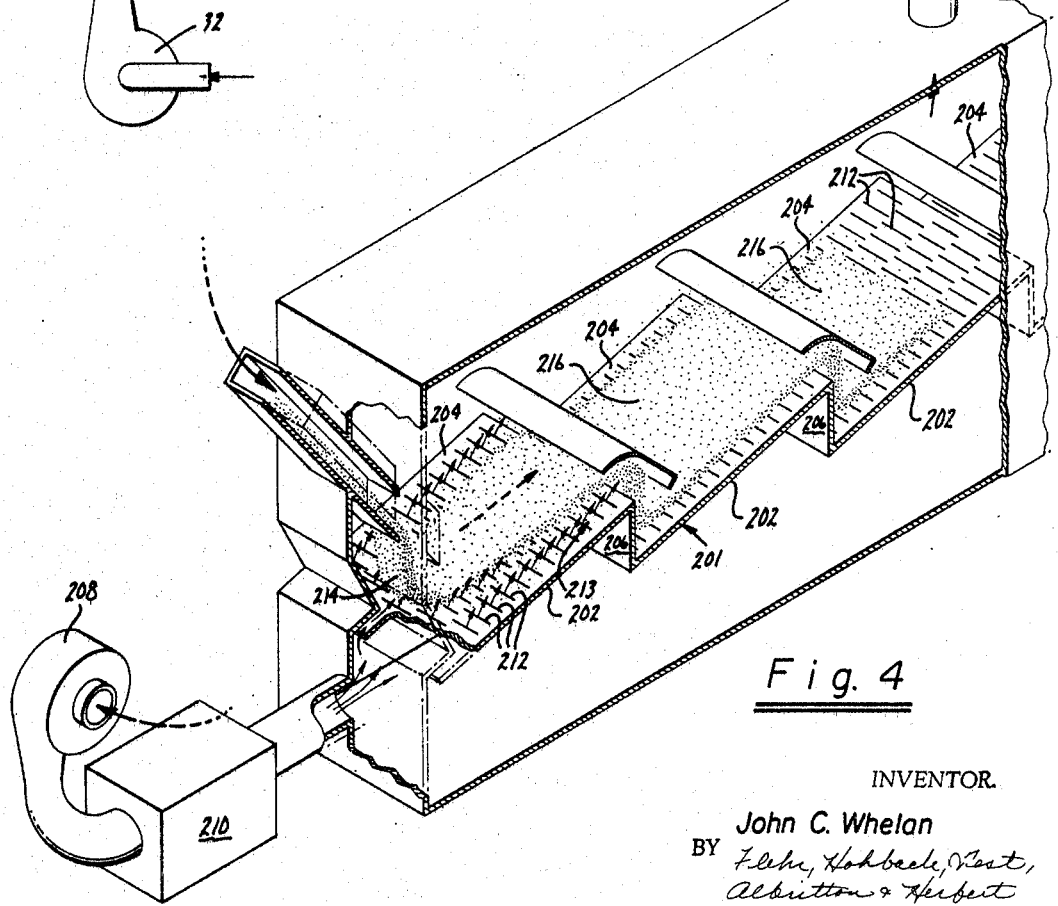
FIGURE 4 is a perspective view of another modified pneumatic conveyor constructed according to the invention.

Referring to FIGURE 4, there is shown another embodiment of pneumatic conveyor constructed according to the invention. As shown, the conveyor 200 consists of an air distribution plate 201 having generally saw tooth shaped sections 202 and extending in a substantially horizontal direction. Each section consists of a ramp portion 204 and a vertical portion 206 which returns to the generally horizontal plane of the conveyor. Means including blower 208 and heater 210 are provided for supplying air to the underside of the plate and passages 212 are formed through the plate for creating a solids conveying air stream 213 thereabove which possesses both vertical and tangential forces so that solids 214 delivered to the plate will be lifted and conveyed by the air in an undulating stream 216. Immediately following the upper end of each ramp and at the crests of the stream, there is mounted a baffle which serves to deflect and impede the motion of the solids being conveyed and to accordingly disrupt the envelope of gas travelling with the solids. In operation, the apparatus of FIGURE 4 is essentially similar to that shown in FIGURE 1. Thus, material conveyed by the air stream starts from a low velocity near zero and is accelerated rapidly by the air stream to travel up a ramp. During this acceleration, heat exchange between the stream and the particle is very good. Before the particles attain a speed which would cause damage and attrition by the impact with the baffle, the ramp is terminated and the baffle interposed to stop the forward progress of the particle which drops back to the bottom of the next ramp. The particle is then reaccelerated by the air conveying stream again. In this way, rapid and effective heat exchange is accomplished.

Thus, there has been illustrated and described a novel and effective apparatus for exchanging heat between particulate solids and a solids conveying gas stream. To those skilled in the art to which the invention relates, many modifictaions and adaptations of the invention will suggest themselves without departing from the spirit and scope. For example, while there has been disclosed open-channel conveying systems, the invention is believed to be applicable to a closed-channel pneumatic conveying system. In such systems, the Reynolds number associated with the flow of particle solids through the system can be drastically changed by abrupt changes in the cross-sectional dimensions of the closed channel. As is known, a turbulent flow is introduced when the Reynolds number exceeds a value of about 2,300. In a closed-channel system all three predominating forces on the solids can be changed by successively greater enlargements or reductions in the channel size. Baffles can be incorporated to completely stop the flow at spaced locations. In any case, when the flow of the particles is stopped, and the envelope of gas surrounding the moving particle is disrupted, turbulent flow of the gas is created and enhanced conductive contact and opportunity for exchange of heat between the conveying gas stream and the solids stream is achieved. While the present description has taken particulate solids as an example of matter to which the invention is applicable, it will be obvious to those skilled in the art that liquid matter in the form of droplets can also be treated by the apparatus of the invention. Accordingly, the descriptions and disclosures herein are to be taken as illustrative of the invention and not as a limitation thereon.

I claim:

1. Apparatus for exchanging heat between solid particles and gas comprising a bounding plate having an upstream portion and a downstream portion, means for supplying gas under pressure to one side of said bounding plate, means including passages through said bounding plate between said upstream portion and said downstream portion thereof for releasing said gas under pressure from said one side of said bounding plate to flow through said passages to the other side of said bounding plate, means for supplying solid particles to said other side of said bounding plate in the upstream portion thereof, a baffle disposed on said other side of and spaced away from said bounding plate between said upstream portion and said downstream portion thereof and approximately in alignment with said passages, and a weir ramp intermediate said passages and said baffle and approximately in alignment with said passages, said weir ramp substantially merging with said bounding plate on said other side thereof and toward said upstream portion thereof with respect to said passages and said weir ramp being substantially spaced away from said bounding plate on said other side thereof and toward said downstream portion thereof with respect to said passages.

References Cited

UNITED STATES PATENTS

| 2,371,619 | 3/1945 | Hartley | 34—57 |
| 3,012,331 | 12/1961 | Oholm et al. | 34—10 |
| 3,304,619 | 2/1967 | Futer | 165—104 |
| 3,394,463 | 7/1968 | Futer | 34—57 |

ROBERT A. O'LEARY, Primary Examiner

T. W. STREULE, Assistant Examiner

U.S. Cl. X.R.

165—104